United States Patent [19]

Lowry et al.

[11] 4,389,836
[45] Jun. 28, 1983

[54] CARRIAGE FOR A GRASS TRIMMING DEVICE

[76] Inventors: Joseph M. Lowry, 308 Sweetbriar Dr.; Ernest E. Griffin, 12306 Ridgefield Pkwy., both of Richmond, Va. 23233

[21] Appl. No.: 281,421

[22] Filed: Jul. 8, 1981

[51] Int. Cl.³ .............................................. A01G 3/06
[52] U.S. Cl. .................................... 56/12.7; 56/16.9; 56/17.5
[58] Field of Search ............. 56/12.7, 16.9, 17.5, 56/255, 2; 24/221 R; 172/15, 17

[56] References Cited

U.S. PATENT DOCUMENTS

| | | | |
|---|---|---|---|
| 2,291,975 | 8/1942 | Minero | 24/221 R |
| 2,793,485 | 5/1957 | Emmons et al. | 56/17.5 |
| 3,587,749 | 6/1971 | Sauer | 56/17.5 |
| 3,759,020 | 9/1973 | Simmons | 56/17.5 |
| 3,774,379 | 11/1973 | Mizobata et al. | 56/16.9 |

*Primary Examiner*—Jay N. Eskovitz
*Attorney, Agent, or Firm*—Cushman, Darby & Cushman

[57] ABSTRACT

A wheeled platform is provided with a centrally located aperture for receiving and supporting the lower portion of a housing for a grass trimming device so that the cutting element of the device will extend beneath the platform and the motor housing will extend above the platform; coupling members are provided on the platform around the aperture and on the trimming device or on a flange member which is attachably connected to the grass trimming device such that the coupling members on the platform portion are offset at a predetermined angular distance from those on, for example, the flange member; the coupling members can be interengaged by orienting the trimming device or the flange member equal to the offset predetermined angular distance and rotated to align with the central longitudinal axis of the platform.

14 Claims, 11 Drawing Figures

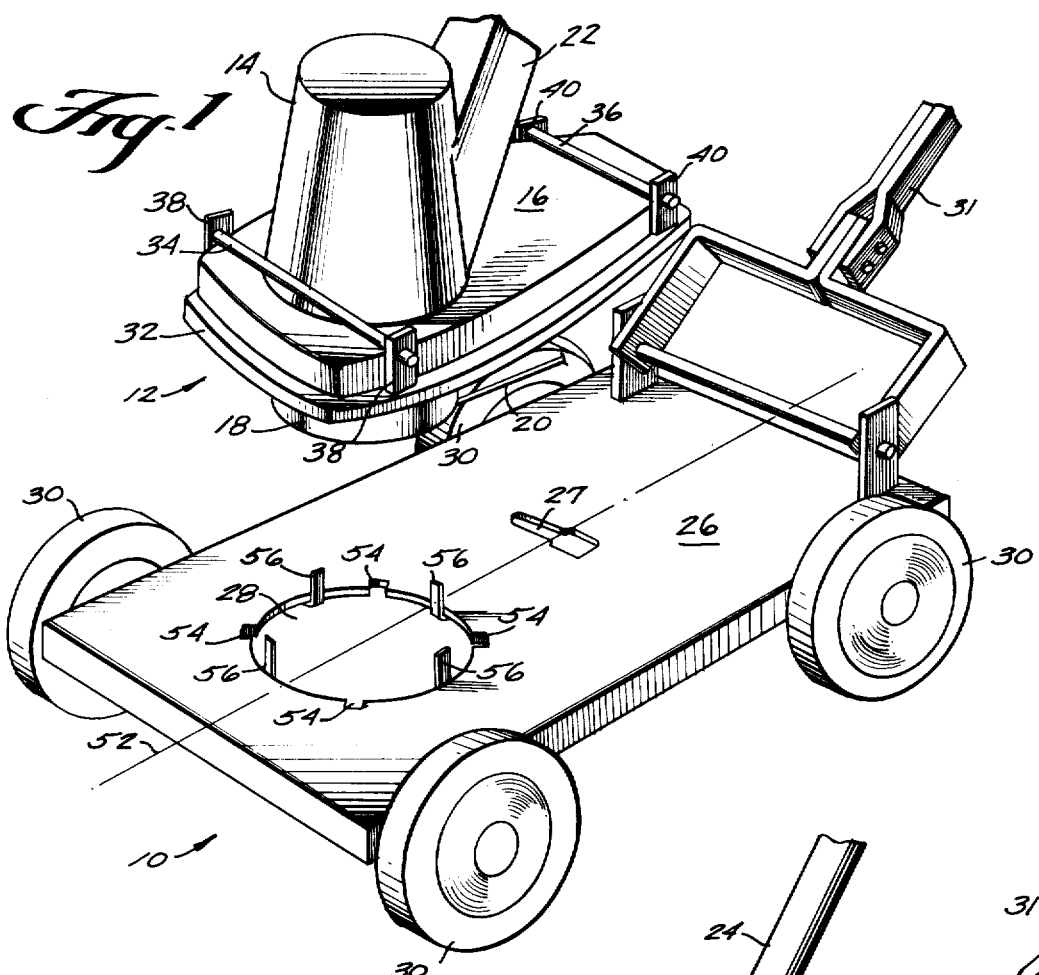
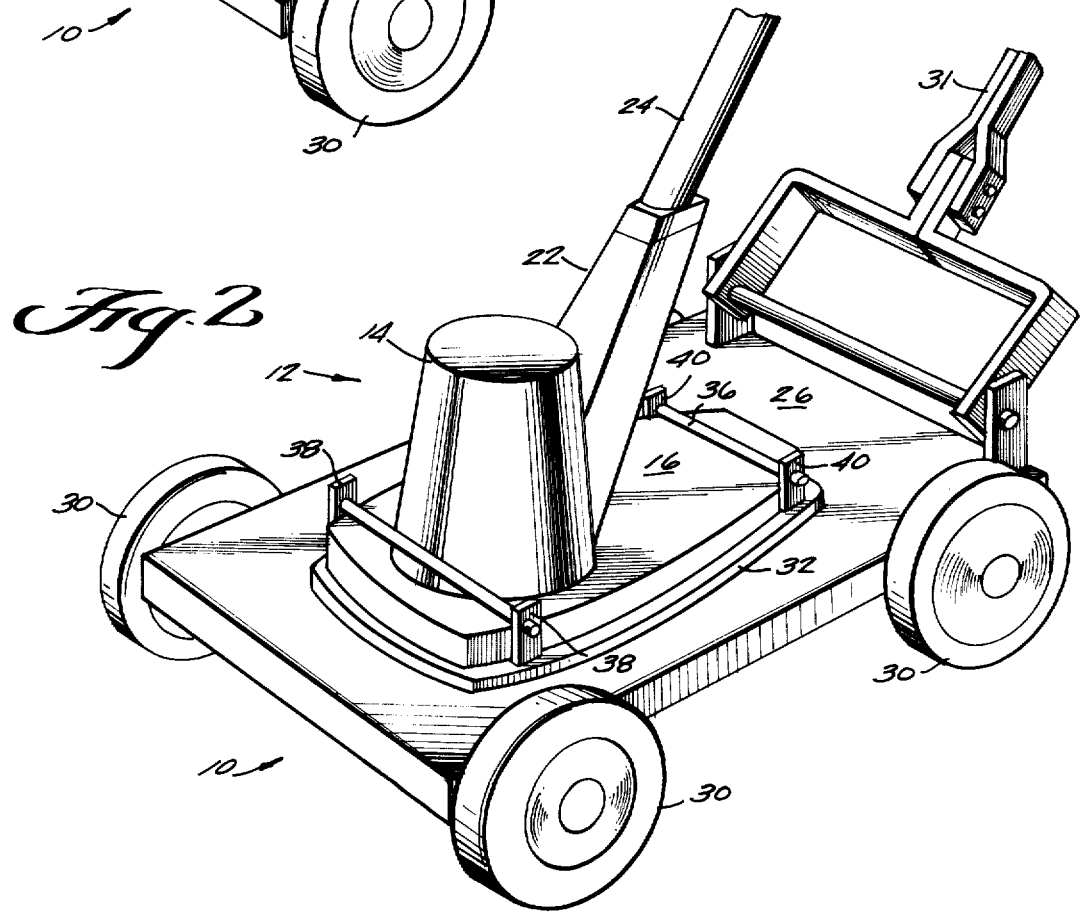

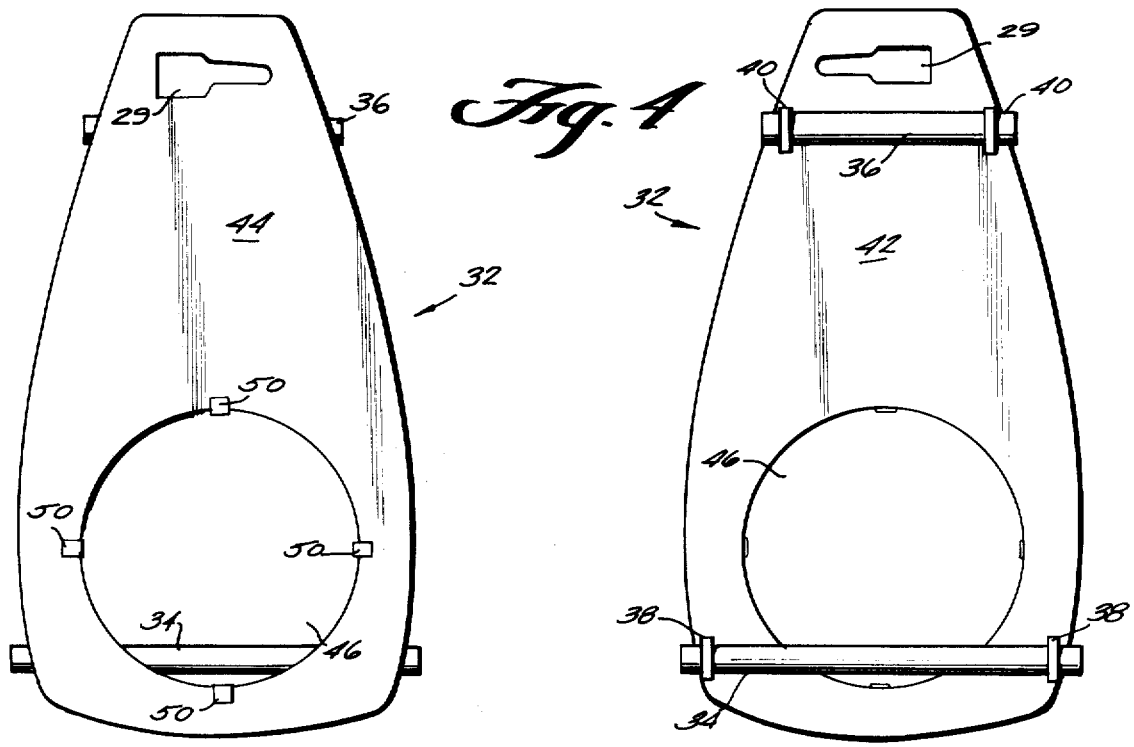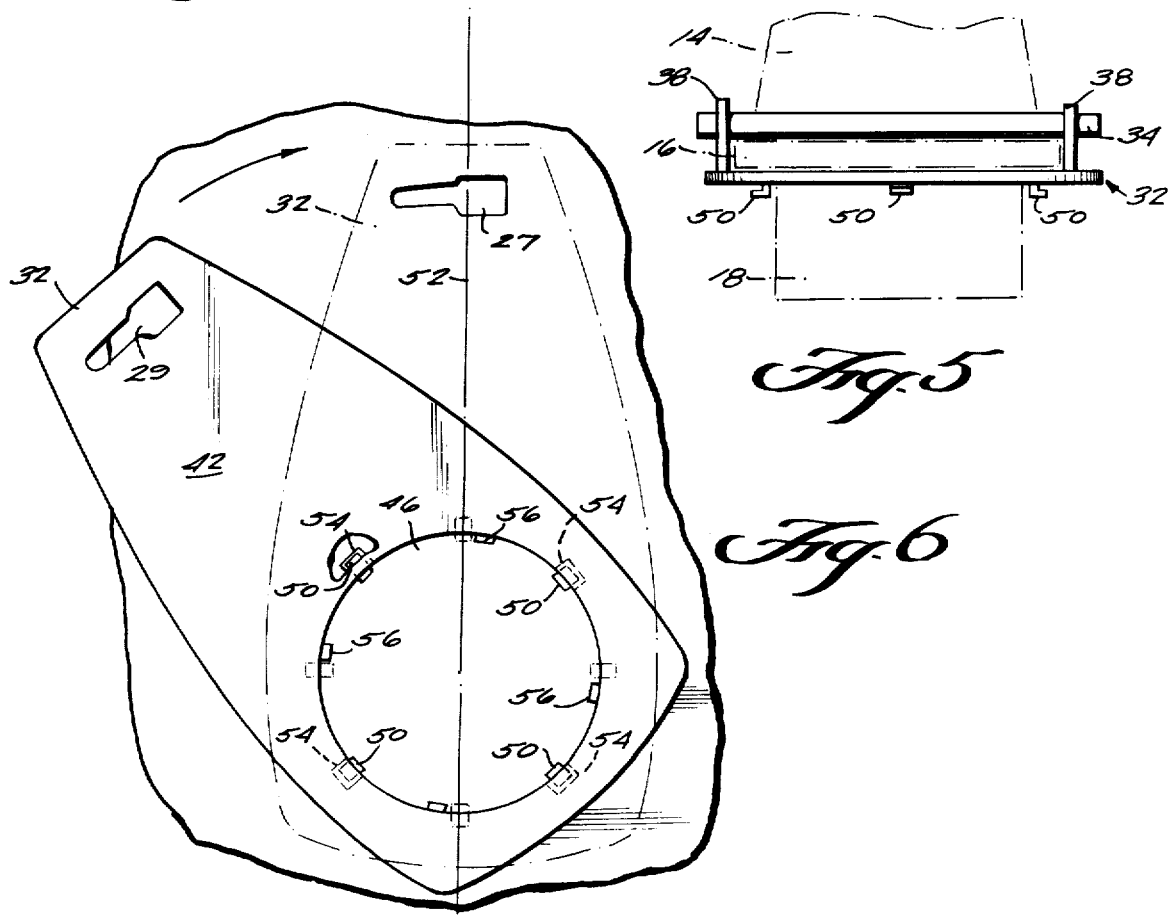

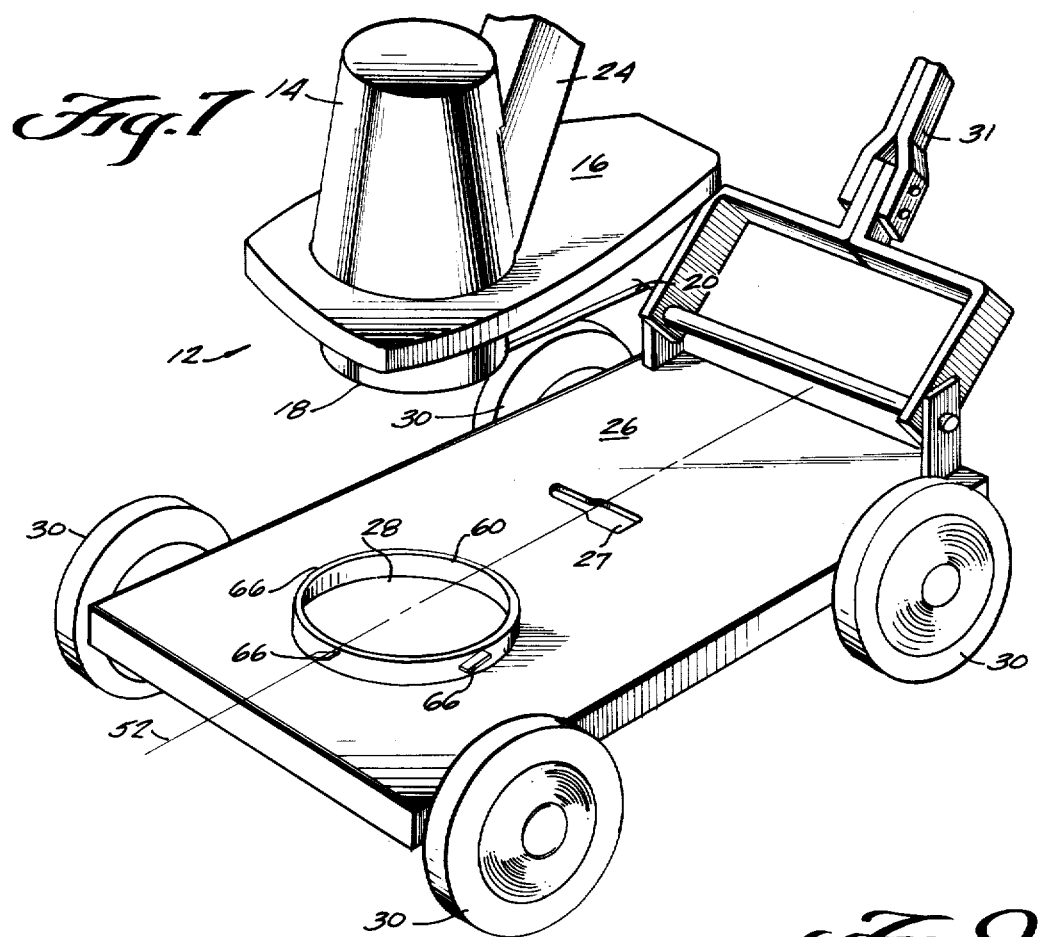
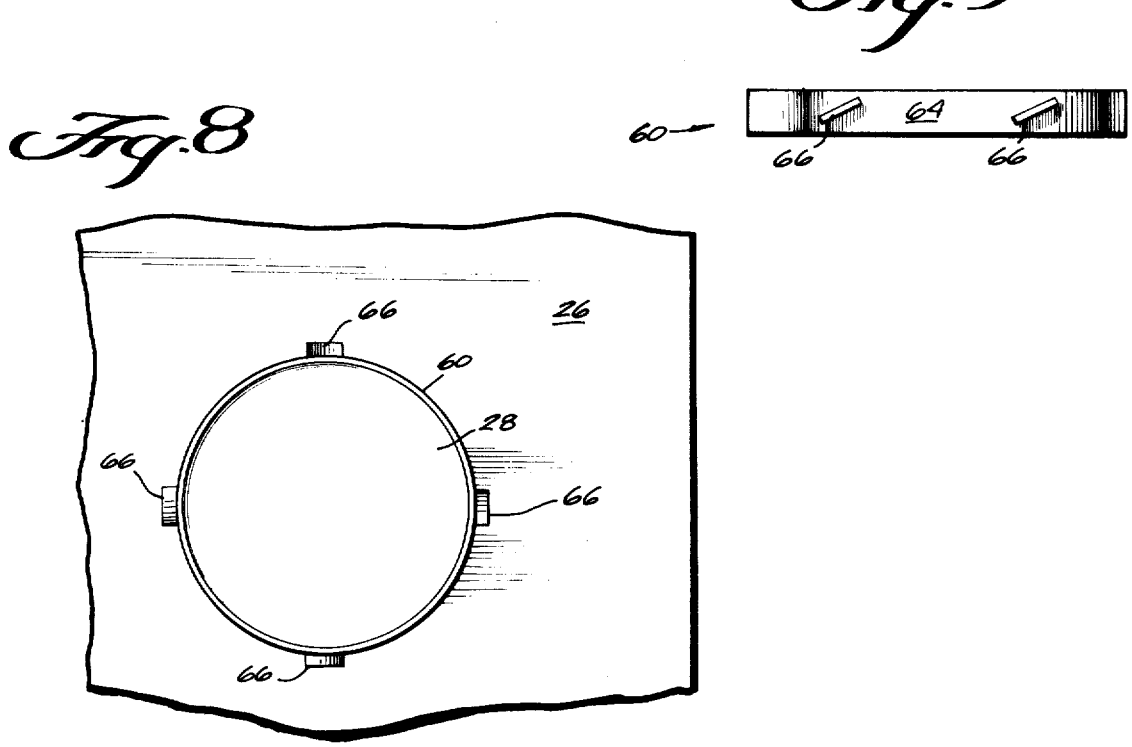

CARRIAGE FOR A GRASS TRIMMING DEVICE

BACKGROUND AND SUMMARY OF THE INVENTION

The present invention relates to a carriage having wheels and a handle and an aperture for engaging and retaining a grass or weed cutting device of the type utilizing a cable rotated by a motor output to cut grass, weeds or the like close to objects that cannot be cut by the conventional power or hand mower.

For some years now, trimming devices in the form of rapidly rotated cables of nylon or the like have been employed to manicure lawns and cut weeds around objects that cannot be cut by a conventional lawnmower due to the inability of the mower to closely approach such objects as fences, trees, walls or the like. Such cable trimming devices have been very popular since they have eliminated the task of operating hand clippers to trim the edges of lawns around objects such as those enumerated above.

However, in a number of circumstances, the weight of such devices has proved to be an impediment to their use and the fact that the devices have been designed to be hand held has also limited their application to a number of trimming jobs such as under large trees and bushes having extensive overhanging foliage, or under fixedly mounted lawn furniture. For long periods of operating time, the devices can be a considerable burden to handle due to their weight and due to the fact that care must be taken to maintain the electric cord in a safe position. Also, where the devices are gas operated, the weight of the motor and fuel can be a critical factor contributing to early fatigue for the user. Thus, where trimming devices of either the electrical or combustion engine driven type have been employed for working on estates, public parks or the like, worker fatigue will be a significant problem which will inevitably reduce efficiency. Additionally, use of these hand held trimmers on certain landscapes can be dangerous, such as, where the terrain is very steep providing difficulty for the operator to maintain a balanced foothold.

The present invention overcomes the foregoing disadvantages by providing a wheeled carriage for the electrical or gas driven trimming devices such that the trimming device can be easily mounted and dismounted from the carriage. The present invention provides for the trimming device to be securely held on the carriage with the advantage that the working period is significantly increased due to a lessening of worker fatigue. Use of the carriage of the present invention will enable an operator to cut grass and weeds in locations that have previously been inaccessible for hand held operation, such as, under trees with low hanging boughs, porches, lawn furniture or the like. Additionally, the carriage of the present invention can be provided with a telescoping handle so that an operator will be able to cut or trim edge sections located on steep banks while being able to stand at a distance from the cutting site.

The carriage of the present invention is designed for cooperation with electrically driven or gas driven trimming devices of the type where a section of cord extends from a motor output and which is rotated at high speeds about a central axis of the motor. Conventionally, such devices have a skirt portion extending from the motor housing with the motor located above the skirt portion and the cutting cord located below the skirt.

Previous carriages have been proposed, such as those disclosed in our copending U.S. application Ser. No. 119,176, filed Feb. 6, 1980, now U.S. Pat. No. 4,287,709, the entire disclosure of which is incorporated herein by reference. However, the carriage of the present invention contemplates an improved coupling apparatus for securely, yet removably coupling the grass trimming device thereto. As will be explained in more detail below, the carriage of the present invention is designed so that the trimming device can be coupled and uncoupled with a turning movement. In such a manner, the trimming device can be easily removed when the operator desires to hand carry the device for trimming extremely difficult to reach locations, e.g. in a corner, along a wall or the like. Subsequently, the operator can easily couple the trimming device to the carriage of the present invention and resume normal trimming operations.

Other features and advantages of the present invention will become apparent as consideration is given to the accompanying detailed description taken in conjunction with the accompanying drawings.

BRIEF DESCRIPTION OF THE DRAWINGS

FIG. 1 is a perspective view of one exemplary embodiment of the present invention showing the carriage and the grass trimming device in an uncoupled relationship;

FIG. 2 is a perspective view of the embodiment of FIG. 1 showing the carriage and the grass trimming device in a coupled relationship;

FIG. 3 is a bottom plan view of a flange member utilized in the embodiment of FIG. 1 according to the present invention;

FIG. 4 is a top plan view of the flange member depicted in FIG. 3;

FIG. 5 is a front elevational view of the flange member depicted in FIG. 4;

FIG. 6 is a fragmentary top plan view of the carriage according to the present invention showing the coupling sequence thereof in which the clamps of the flange and the trimming device are omitted for clarity;

FIG. 7 is a perspective view of another exemplary embodiment of the present invention showing the carriage and the grass trimming device in an uncoupled relationship;

FIG. 8 is a fragmentary top plan view of the embodiment depicted in FIG. 7 which shows the collar portion of the carriage;

FIG. 9 is a detailed elevational view of the collar portion depicted in FIG. 8;

DETAILED DESCRIPTION OF THE INVENTION

Figure 10:
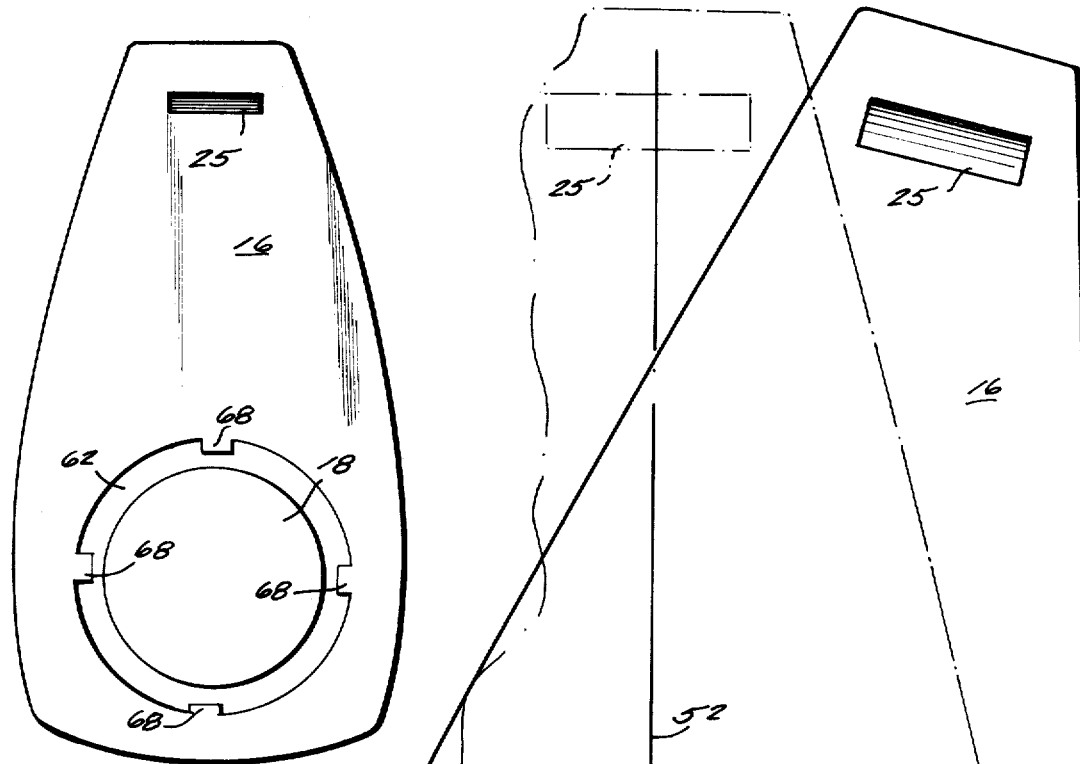
FIG. 10 is a bottom view of the grass trimming device to be coupled to the collar depicted in FIGS. 8 and 9.

Referring now more specifically to FIGS. 1 and 2, the carriage 10 of the present invention on which is supported a conventional grass trimming device 12 is shown in an uncoupled and a coupled relationship, respectively. The carriage 10 of the present invention is designed to cooperate with the grass trimming device 12 which is of the type having a motor housing 14 which extends upwardly from a peripheral skirt portion 16. Extending from the bottom of the housing 14 is a circular rotor 18 to which is attached, interiorly thereof, a plastic cord 20 which is the cutting element of the trimming device 12. In operation, wherein an electric motor is enclosed within a housing 14, a rotor 18 is fixed to the output of the motor to rotate about the central axis of the motor at high speed so as to carry the cord 20 with it in a circular motion. Power for the motor in the housing 14 is provided through an electric cord which extends through a handle mount 22 and handle pole 24 of the trimming device 12.

According to one exemplary embodiment of the present invention as depicted in FIGS. 1-6, a rigid platform 26 is provided with an aperture 28 through which the rotor 18 and cord 20 are inserted when the trimming device 12 is mounted on the carriage 10. The platform 26 is generally rectangular in plan view and has four wheel mounting posts for mounting wheels 30 at each of its corners. The wheel mounting posts can be those posts which are described in copending U.S. application Ser. No. 119,176, filed Feb. 6, 1980 now U.S. Pat. No. 4,287,709. Additionally, a handle 31 can be provided and pivotably attached to the rear of the platform 26. A suitable handle is disclosed in copending U.S. application Ser. No. 119,176, filed Feb. 6, 1980 now U.S. Pat. No. 4,287,709.

In order for a conventional trimming device 12 to be utilized with the carriage according to the present invention, there is provided a flange member 32 which is securely fastened to the grass trimming device 12. The flange member 32 can include suitable attachment structures which will securely fasten the flange member 32 to the trimming device 12. Suitable attaching members can be, for example, spring loaded clips, or clamping bar members 34, 36 which transversely extend across and above the skirt portion 16 and which cooperate with post members 38, 40, respectively. In such a manner, the flange member 32 will be securely attached to the trimming device 12 and will, thus, cooperate as one unit.

Certain trimming devices may have a blade (shown in FIGS. 10 and 11 at 25) which cuts the cord 20 thereby maintaining it at a predetermined length. Therefore, the platform 26 and flange 32 can be provided with an opening 27 and 29, respectively, to allow the blade 25 to be properly positioned for its cutting operation. The opening 27 may be elongated to allow for the turning movement necessary to couple the flange member 32 to the platform 26, as will be described below.

Referring now more specifically to FIGS. 3-5 wherein an exemplary flange member 32 of the present invention is shown, it will be apparent that the flange member 32 has a top side 42 and a bottom side 44, each of which is generally planar in nature. The flange member defines an aperture 46 through which the rotor 18 can extend thereby enabling the cutting element to eventually be extended below the carriage 10. In FIG. 4, the clamping bar members 34, 36 can be more clearly seen in position with the grass trimming device removed for clarity. The clamping bar members 34, 36 cooperate with posts 38 and 40 to securely fasten the flange member 32 to the bottom side of the trimming device 12. As will be appreciated, the top side 42 of the flange member 32 will be in a juxtaposed relationship with the bottom portion of the trimming device 12, and, more particularly, the bottom portion of the skirt 16.

On the bottom side 44 of the flange member 32 around the periphery of aperture 46, there is provided at least one, preferably a plurality, of male interengaging members 50 which extend from the bottom of the flange member 32 a predetermined distance at least equal to the thickness of the platform 26 which defines the aperture 28. Additionally, a portion of the male interengaging members 50 are outwardly turned so that the flange member 32 will be securely fastened to the carriage 10 when in a coupled relationship. Preferably, the male interengaging members 50 can be L-shaped so that the portion of the carriage platform 26 which defines the aperture 28 can be accepted therein and, thus, securely couple the flange member 32 thereto.

The interengaging male members 50 are preferably aligned axially in pairs, each pair being generally 90° or perpendicular from the other pair. In such a manner, one pair of male interengaging members 50 will be disposed along the circumference of the aperture 46 along the longitudinal axis thereof while the other pair of male interengaging members 50 will be disposed perpendicular with respect thereto.

Referring now to FIG. 1, wherein the aperture 28 is situated in the platform 26 in such a manner that the longitudinal axis 52 centrally intersects aperture 28, it can be seen that the platform 26 additionally defines female cavities 54 around the periphery of aperture 28. The female cavities 54 are generally offset a predetermined angular distance relative to the male interengaging members 50. Additionally, female cavities 54 are of sufficient dimensions such that the male interengaging members 50 and, particularly, the outwardly turned portion thereof will be able to pass through the female cavities 54 when the flange member 32 is offset to the same predetermined angular distance. In such a manner, the male interengaging members will pass through the female cavities and upon turning the flange member 32 to axially align it with the longitudinal axis 52, a portion of the platform 26 will be engaged with the male interengaging members 50 thereby securely fastening the flange member 32 to the carriage 10.

As can be seen more clearly in FIG. 6, the solid lines of the flange member 32 depict the flange member 32 at an offset position generally equal to the predetermined angular distance of the female cavities 54. The male interengaging members 50 will pass through the female cavities 54 when the flange member 32 is properly aligned at the offset predetermined angular distance. The flange member 32 may then be subsequently turned to a position which is generally coaxial with the longitudinal axis 52 of the carriage 10. In such a manner, the flange member 32 will be securely held in place by the male interengaging members 50 and can be removably coupled therefrom by a reverse turning movement.

Additionally, the platform 26 can be provided with guide members 56 which extend above the top side of the platform 26. The guide members 56 are intended to enter the space (shown in FIG. 10 at 62) defined between the rotor 18 and the skirt portion 16 of the trimming device 10. In such a manner, additional support is provided for the trimming device 10 and a turning limitation structure is provided.

Referring now more specifically to FIGS. 7-11 wherein another embodiment of the present invention is depicted, it can be seen in FIG. 7 that the carriage is similar in construction to that depicted in FIGS. 1-6. In particular, the carriage is provided with four wheels 30 at each corner of the platform and can be mounted thereto by wheel mounting posts as previously discussed.

Figure 11:
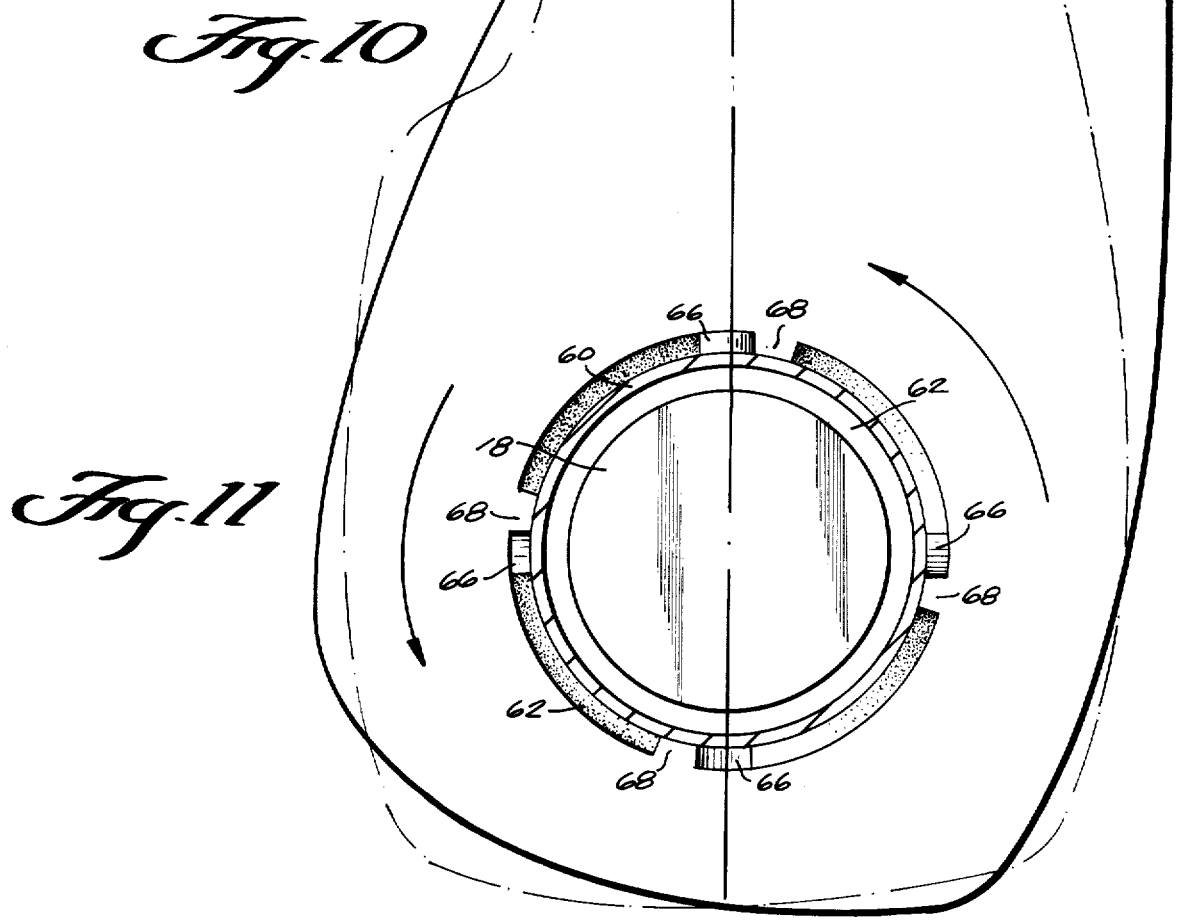
FIG. 11 is a fragmentary bottom plan view of the embodiment of FIG. 7 showing the coupling relationship thereof with the collar which is partly in section.

The coupling member of the embodiment depicted in FIG. 7 generally comprises a collar 60 which is extended a predetermined distance above the platform 26 and which can enter the space defined between the grass trimming device skirt 16 and the rotor 18. The space 62 defined between the grass trimming device skirt 16 and the rotor 18, as can be more clearly seen in FIGS. 10 and 11, is sufficient to accept the collar 60 therein. On the outside surface 64 of the collar there are provided a plurality of second engaging members 66. Referring to FIGS. 8 and 9 the second engaging members 66 may generally be tab shaped and extend from the collar outside surface 64. Additionally, such second engaging members 66 can be disposed at an angle relative to the horizontal plane.

The grass trimming device 10 of the present embodiment is contemplated to include between the skirt portion 16 and the rotor 18, first engaging members 68 which are generally horizontal and extend inwardly toward the rotor 18 into the space 62. In such a manner, the grass trimming device 10 can be placed over the collar 60 and rotated in the direction of the slant on the second engaging members 66 so that a coupling relationship will be effected between the trimming device 10 and the platform 26. When the grass trimming device 10 is rotated or turned from its initial engagement position (shown as solid lines in FIG. 11) to its final coupled position (shown as dashed lines in FIG. 11), the device 10 will generally coincide with the longitudinal axis 52 of the platform 26. In such a manner, the first engaging members 68 will be forced downwardly by the slope of the second engaging members 66 on the collar 60 such that the second engaging members 66 will be in a juxtaposed position over the first engaging members 68. Thus, the force imparted in a downward direction to the grass trimming device 10 securely attaches or couples it to the platform 26. However, if the operator desires to remove the grass trimming device 10 from the carriage, it should be appreciated that a counter rotational movement to that depicted in FIG. 11 can be effected thereby releasing the coupling relationship of the first and second engaging members, 68 and 66, respectively, to effect disengagement of the trimming device 10 from the platform 26.

It should be particularly noted that the invention described above can be modified within the spirit and scope of the disclosure contained herein and the appended claims. Thus, the embodiment depicted in FIGS. 1-6 can be utilized without the flange member 32 in such a manner that the male members 50 which extend below the skirt portion 16 of the grass trimming device 10 can be provided as an integral unit with the grass trimming device 10. Similarly, the first engaging members 68 of the embodiment depicted in FIGS. 7-11 can be provided on a flange member 32 which would be attached to the grass trimming device 10 and subsequently coupled to the collar member and second engaging members 66.

While the above invention has been described in what is presently conceived to be the most preferred embodiments thereof, it should be understood that many modifications may be made thereto by one of ordinary skill in the art, which modifications should be accorded the broadest interpretation of the appended claims so as to encompass all equivalent structures or assemblies.

What is claimed is:

1. A carriage for a trimming device of the type having a motor, a housing for the motor, a cutting element in the form of a length of cable connected to said motor so as to be rotatable about an axis at a relatively high rate of speed for cutting grass, weeds or the like, said carriage comprising:

a platform having a top and bottom side, means for supporting said platform for movement over the ground, and defining a first aperture for receiving the rotatable length of cable so that cable extends below and is rotatable beneath said platform bottom side;

a flange member having a top and bottom side, means for clamping said flange member to said trimming device so that said top side of said flange member is in a juxtaposed relationship with the bottom side of said trimming device, said clamping means comprising at least one bar member extending across the upper portion of said trimming device and support post members fixedly attaching to said flange member top side for removably receiving said at least one bar member, said flange member defining a second aperture in coaxial alignment with said first aperture for receiving said rotatable length of cable therethrough; and cooperating means located on said flange member and on said platform first aperture for removably coupling and securely holding said flange member to said platform.

2. A carriage as in claim 1 wherein said cooperating means comprises:

at least one male member extending below said flange member a predetermined distance at least equal to the thickness of said platform defining said first aperture and having a portion which is outwardly turned relative to said axis about which said cutting element rotates to define an area between said bottom side of said flange member and said outwardly turned portion to accept a portion of said platform therein; and at least one female cavity defined by said platform and being generally circumferentially arranged about said first aperture and being offset a predetermined angular distance relative to said at least one male member so that said outwardly turned portion of said at least one male member can pass through said at least one female cavity when said flange member is oriented in a position generally equal to said offset predetermined angular distance and so that said at least one male member will accept said portion of said platform when said flange is turned from said offset oriented position to a position generally coaxial with the platform longitudinal axis thereby removably coupling and securely holding said flange member to said platform.

3. A carriage as in claim 1 wherein said cooperating means comprise:

a plurality of first engaging members extending inwardly a predetermined distance from the circumferential surface of said second aperture, and a collar member in coaxial alignment with said first and second apertures extending a predetermined distance above said top side of said platform and having an inner and outer surface, said outer surface including a plurality of second engaging members for cooperation with said first engaging members circumferentially arranged thereon and positioned so that said second engaging members will be in a juxtaposed engaged position above said first engaging members when said flange member is in a coupled relationship with said platform and so that said flange member can be turned thereby disengaging said juxtaposed engaged position to allow uncoupling of said flange member to said platform.

4. A carriage as in claim 1 wherein said clamping means comprises a spring.

5. A carriage as in claim 3 wherein said second engagement members are angularly disposed relative to the horizontal plane so that a downward force is imparted to said first engagement members when said first and second engagement members are in said juxtaposed engaged position.

6. A carriage as in claim 1 wherein said platform includes at least one support post member extending above said platform top side and arranged around the general periphery of said first aperture.

7. A carriage for a trimming device of the type having a motor, a housing for the motor, a cutting element in the form of a length of cable connected to said motor so as to be rotatable about an axis at a relatively high rate of speed for cutting grass, weeds or the like, said carriage comprising:
 a platform having a top and bottom side, means for supporting said platform for movement over the ground, and defining a first aperture for receiving the rotatable length of cable so that said cable extends below and is rotatable beneath said platform bottom side;
 a flange member having a top and bottom side, means for clamping said flange member to said trimming device so that said top side of said flange member is in a juxtaposed relationship with the bottom side of said trimming device, and defining a second aperture in coaxial alignment with said first aperture for receiving said rotatable length of cable therethrough; and
 cooperating means located on said flange member and on said platform first aperture for removably coupling and securely holding said flange member to said platform, said cooperating means comprising a plurality of first engaging members extending inwardly a predetermined distance from the circumferential surface of said second aperture, and a collar member in coaxial alignment with said first and second apertures extending a predetermined distance above said top side of said platform and having an inner and outer surface, said outer surface including a plurality of second engaging members for cooperation with said first engaging members circumferentially arranged thereon and positioned so that said second engaging members will be in a juxtaposed engaged position above said first engaging members when said flange member is in a coupled relationship with said platform and so that said flange member can be turned thereby disengaging said juxtaposed engaged position to allow uncoupling of said flange member to said platform.

8. A carriage as in claim 7 wherein said clamping means comprise a spring.

9. A carriage as in claim 7 wherein said clamping means comprise at least one bar member extending across the upper portion of said trimming device and support post members fixedly attached to said flange member top side for removably receiving said at least one bar member.

10. A carriage as in claim 7 wherein said second engagement members are angularly disposed relative to the horizontal plane so that a downward force is imparted to said first engagement members when said first and second engagement members are in said juxtaposed engaged position.

11. A carriage as in claim 7 wherein said platform includes at least one support post member extending above said platform top side and arranged around the general periphery of said first aperture.

12. A carriage for a trimming device of the type having a motor, a housing for the motor, a generally planar bottom side, a cutting element in the form of a length of cable connected to said motor so as to be rotatable about an axis at a relatively high rate of speed for cutting grass, weeds or the like, said carriage comprising:
 a platform having a top and bottom side, means for supporting said platform for movement over the ground, and defining a first aperture for receiving the rotatable length of cable so that said cable extends below and is rotatable beneath said platform bottom side; and
 cooperating means located on the bottom side of said trimming device and on said platform for removably coupling and securely holding said trimming device to said platform, said cooperating means comprising a plurality of first engaging members extending inwardly a predetermined distance into the space defined between the trimming device bottom side and the connection of the cutting element to the motor, and a collar member in coaxial alignment with said aperture extending a predetermined distance above said top side of said platform and having an inner and outer surface, said outer surface including a plurality of second engaging members for cooperation with said first engaging members circumferentially arranged thereon and positioned so that said second engaging members will be in a juxtaposed engaged position above said first engaging members when said trimming device is in a coupled relationship with said platform and so that said trimming device can be turned thereby disengaging said juxtaposed engaged position to allow uncoupling of said trimming device to said platform.

13. A carriage as in claim 12 wherein said second engagement members are angularly disposed relative to the horizontal plane so that a downward force is imparted to said first engagement members when said first and second engagement members are in said juxtaposed engaged position.

14. A carriage as in claim 12 wherein said platform includes at least one support post member extending above said platform top side and arranged around the general periphery of said first aperture.

* * * * *